(12) United States Patent
Thomsen et al.

(10) Patent No.: US 9,116,627 B2
(45) Date of Patent: *Aug. 25, 2015

(54) VARIABLE PAGE SIZING FOR IMPROVED PHYSICAL CLUSTERING

(71) Applicants: Dirk Thomsen, Heidelberg (DE); Axel Schroeder, Dresden (DE); Ivan Schreter, Malsch (DE)

(72) Inventors: Dirk Thomsen, Heidelberg (DE); Axel Schroeder, Dresden (DE); Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/302,226

(22) Filed: Jun. 11, 2014

(65) Prior Publication Data

US 2014/0297777 A1    Oct. 2, 2014

Related U.S. Application Data

(63) Continuation of application No. 13/072,575, filed on Mar. 25, 2011, now Pat. No. 8,990,166.

(51) Int. Cl.
*G06F 7/00* (2006.01)
*G06F 3/06* (2006.01)
*G06F 11/14* (2006.01)

(52) U.S. Cl.
CPC ............ *G06F 3/0626* (2013.01); *G06F 3/061* (2013.01); *G06F 3/064* (2013.01); *G06F 3/067* (2013.01); *G06F 3/0655* (2013.01); *G06F 3/0683* (2013.01); *G06F 3/0641* (2013.01); *G06F 3/0685* (2013.01); *G06F 11/1471* (2013.01); *G06F 2212/652* (2013.01)

(58) Field of Classification Search
None
See application file for complete search history.

(56) References Cited

U.S. PATENT DOCUMENTS

| | | | |
|---|---|---|---|
| 5,765,201 A * | 6/1998 | Manges et al. | 711/201 |
| 6,557,055 B1 | 4/2003 | Wiese | |
| 2002/0194429 A1 * | 12/2002 | Chiu et al. | 711/118 |
| 2004/0193803 A1 | 9/2004 | Mogi et al. | |
| 2004/0205296 A1 * | 10/2004 | Bearden | 711/129 |
| 2006/0277389 A1 * | 12/2006 | Hepkin et al. | 711/203 |
| 2008/0177975 A1 | 7/2008 | Kawamura | |
| 2008/0263261 A1 * | 10/2008 | Fujimoto et al. | 711/100 |
| 2010/0191919 A1 * | 7/2010 | Bernstein et al. | 711/141 |
| 2010/0191922 A1 * | 7/2010 | Dickey et al. | 711/154 |

OTHER PUBLICATIONS

"MaxDB" from Wikipedia, the free encyclopedia, Jun. 13, 2010, retrieved from the Internet: <https://web.archive.org/web/20100613235551/http://en.wikipedia.org/wiki/MaxDB>, downloaded on Jun. 13, 2014.

(Continued)

*Primary Examiner* — Debbie Le
*Assistant Examiner* — Hasanul Mobin
(74) *Attorney, Agent, or Firm* — Mintz Levin Cohn Ferris Glovsky and Popeo, P.C.

(57) ABSTRACT

A data size characteristic of contents of a related unit of data to be written to a storage by an input/output module of a data storage application can be determined, and a storage page size consistent with the data size can be selected from a plurality of storage page sizes. The related unit of data can be assigned to a storage page having the selected storage page size, and the storage page can be passed to the input/output module so that the input/output module physically clusters the contents of the related unit of data when the input/output module writes the contents of the related unit of data to the storage. Related methods, systems, and articles of manufacture are also disclosed.

16 Claims, 4 Drawing Sheets

(56) References Cited

OTHER PUBLICATIONS

Jörg Hoffmeister, "From SAP DB to MySQL MaxDB", SAP AG, 2003, retrieved from the Internet: <http://www.sapdb.org/7.4/pdf/teched03.pdf>, downloaded Jun. 20, 2014.

"Hot Standby—SAP Documentation", Dec. 15, 2008, retrieved from the Internet: <https://web.archive.org/web/20081215143537/http://maxdb.sap.com/doc/7_7/44/c36eb3865960efe10000000a155369/content.htm>, downloaded on Jun. 20, 2014.

* cited by examiner

VARIABLE PAGE SIZING FOR IMPROVED PHYSICAL CLUSTERING

CROSS REFERENCE TO RELATED APPLICATIONS

This application is a continuation application of U.S. patent application Ser. No. 13/072,575, filed Mar. 25, 2011, entitled "Variable Page Sizing for Improved Physical Clustering," the contents of which is hereby incorporated by reference in its entirety.

TECHNICAL FIELD

The subject matter described herein relates to optimizing performance in database systems and other computing environments in which data are written and/or read from a storage medium or storage device.

BACKGROUND

Storage pages can be used in association with a data storage application that writes and/or reads data from a persistency layer that can include active data stored in fast but relatively expensive memory that is in turn written to a less expensive storage for longer term retention. The persistence layer can ensure that changes made within the data storage application are durable and that the data storage application can be restored to a most recent committed state after a restart. A committed state is achieved by writing the changes made to data in the persistence layer to the longer term storage. Data are stored in the longer term storage are organized in storage pages, a term that refers to a unit of physical storage.

SUMMARY

In one aspect, a method includes determining a data size characteristic of contents of a related unit of data to be written to a storage by an input/output module of a data storage application. A storage page size consistent with the data size is selected from a plurality of storage page sizes, and the related unit of data is assigned to a storage page having the selected storage page size. The storage page is then passed to the input/output module so that the input/output module physically clusters the contents of the related unit of data when the input/output module writes the contents of the related unit of data to the storage.

In some variations one or more of the following features can optionally be included in any feasible combination. The data storage application can include at least one of a database application and a network-attached storage system. The plurality of storage page sizes can include page sizes varying over at least one regular interval from a minimum atomic input/output size of the input/output module to a maximum page size. The at least one regular interval can include a factor of four. The at least one regular interval can include an integer factor greater than 1 and smaller than approximately 10. A persistence layer associated with the data storage application can determine the data size characteristic of contents of the related unit of data.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims. For example, while the specific examples described below to illustrate features of the current subject matter make reference to the data storage application being a database, other types of data storage applications are within the scope of the current subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
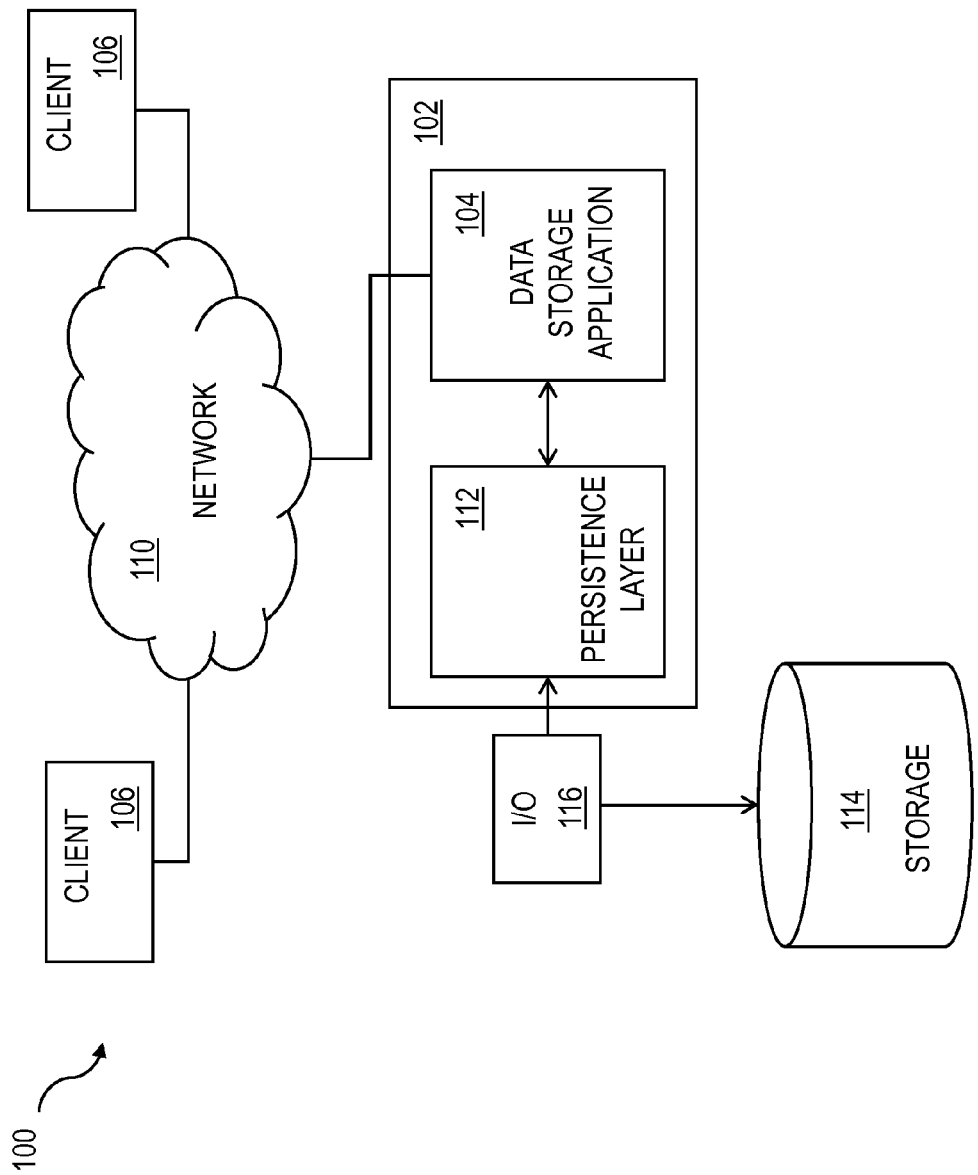
FIG. 1 is a box diagram illustrating aspects of a system at least some of whose features are consistent with implementations of the current subject matter.

FIG. 1 shows an example of a system 100 in which a computing system 102, which can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. in a page buffer or other type of temporary data container), which can write the data, in the form of storage pages, to one or more storages 114, for example a via an input/output component 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output component 116 can be included in the computing system 102 despite their being shown as external to the computing system 102 in FIG. 1.

A typical data storage application 104 passes storage pages of a single, fixed size (e.g. 8 kB) to the input/output component 116. The content of the storage 114 can change when storage pages are written from the persistence layer 112 to the storage 114. The persistence layer 112 generally determines when a write operation occurs, for example during page replacement, when a next savepoint is written, or the like. However, the input/output component 116 generally does not possess or receive information about how the storage pages required to contain the resulting data should be logically clustered.

Thus, when a unit of related data (e.g. a database table) having a data size in excess of the single, fixed size of the storage pages is passed from the persistence layer 112 to the input/output component 116 to be written to the storage 114 in conjunction with other data, the input/output component may use multiple storage pages to accommodate all of the data within the related unit of data. However, the input/output component 116 typically does not possess or receive information about how the required storage pages should be logically clustered when they are written to the storage 114. As such, the input/output component 116 may write the several storage pages required to contain all of the data in the related unit of data to physical locations that are physically scattered throughout the storage 114. Physical scattering refers to related data being stored in non-contiguous physical blocks on the storage 114. Over time, successive reads and writes to the storage 114 can cause additional physical scattering of the storage pages throughout the storage 114, particularly as the data in the related unit of data are modified, updated, altered, or otherwise changed or moved on the storage 114. To load the entire related unit of data, all of the storage pages used to store data of the related unit of data must be accessed from the storage 114.

If the storage pages containing data of a related unit of data are physically scattered throughout the storage 114, higher that acceptable loads times can be required to access all of the required data for the data storage application 104 to present the related unit of data. Because storage pages belonging logically together as part of a related unit of data are often read in combination, physical scattering or dispersal of the related pages can negatively affect performance due to longer read and write times. In the example of a hard disk drive, storage of related pages in physically scattered memory blocks on the disk can require excessive movement of the drive's read/write head that can be substantially reduced if the pages were better clustered in memory blocks more closely located to one another.

To address these and potentially other issues with currently available solutions, one or more implementations of the current subject matter provide methods, systems, articles or manufacture, and the like that can, among other possible advantages, enable use of a standard input/output module, sub-system, interface, or the like without need to provide additional information about how the resulting data are to be grouped on the storage. In this manner, data belonging to a related unit of data are physically clustered when they are written to the storage 114.

Using different storage page sizes as described herein can remove the need for use of a complicated algorithm by the data storage application 104, the persistence layer 112, or the input/output component 116 to achieve clustering. As storage pages are written by block transmission to the underlying input/output component 116, knowledge about clustering is also given to the input/output component 116, so that consecutive storage location can be used for large related units of data. Using clustering/grouping of small pages created by the data storage application 104 level can, in contrast, lead to less favorable results because the small blocks may be written to different physical storage locations by the input/output component 116.

Figure 2:
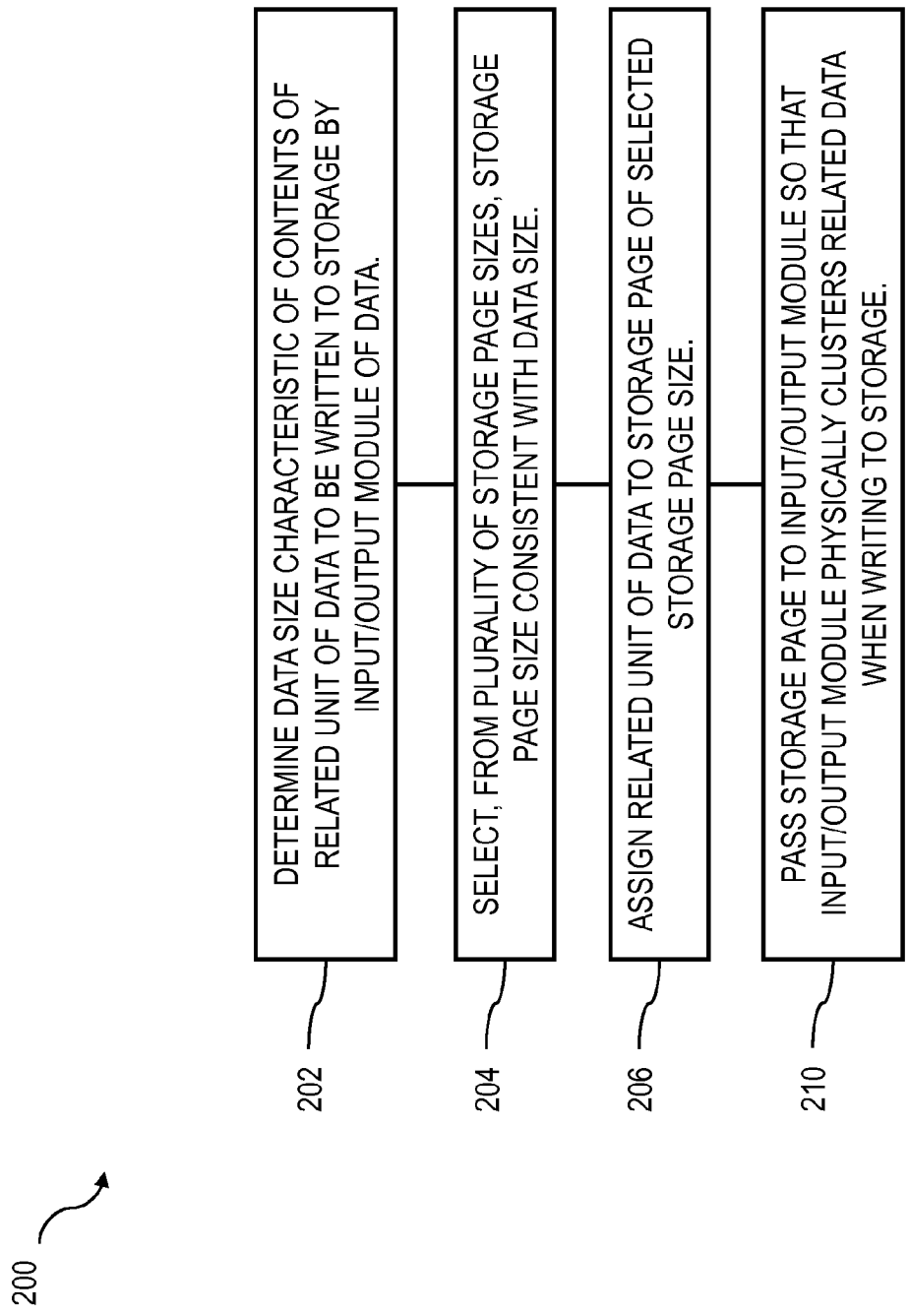
FIG. 2 is a process flow diagram illustrating features of a method consistent with implementations of the current subject matter.

FIG. 2 shows a process flow chart 200 illustrating features of a method at least some of which are consistent with an implementation of the current subject matter. At 202, a data size characteristic of contents of a related unit of data to be written to a storage 114 by an input/output component 116 of a data storage application 104 is determined. A storage page size consistent with the data size is selected at 204 from a plurality of storage page sizes. At 206, the related unit of data is assigned to a storage page having the selected storage page size. The storage page is passed to the input/output component 116 at 210 so that the input/output module physically clusters the contents of the related unit of data when the input/output component 116 writes the contents of the related unit of data to the storage 114.

In an implementation, a size of a storage page passed by the persistence layer 112 to the input/output component 116 can vary from a smallest available size (e.g. a minimum atomic input/output size of the input/output module) of about 2 kb, or alternatively about 4 kB or about 8 kB, to a maximum size of about 16 MB or alternatively 64 MB or some other maximum size. Commonly available input/output modules typically use a minimum page size in a range of 512 B to 4 kB. A series of variable storage page sizes can be provided starting from a smallest size and increasing in size by a factor of four with each successive size increase (e.g. 4 kB, 16 kB, 64 kB, 256 kB, 1 MB, ..., Maximum size). Alternatively, some other factor (e.g. an integer greater than 1 and smaller than approximately 10) can be used as the factor by which the available storage pages sizes increase in size. An appropriate size of a single storage page is selected from the available storage page sizes to accommodate the data size of the data in the related unit of data.

Figure 3:
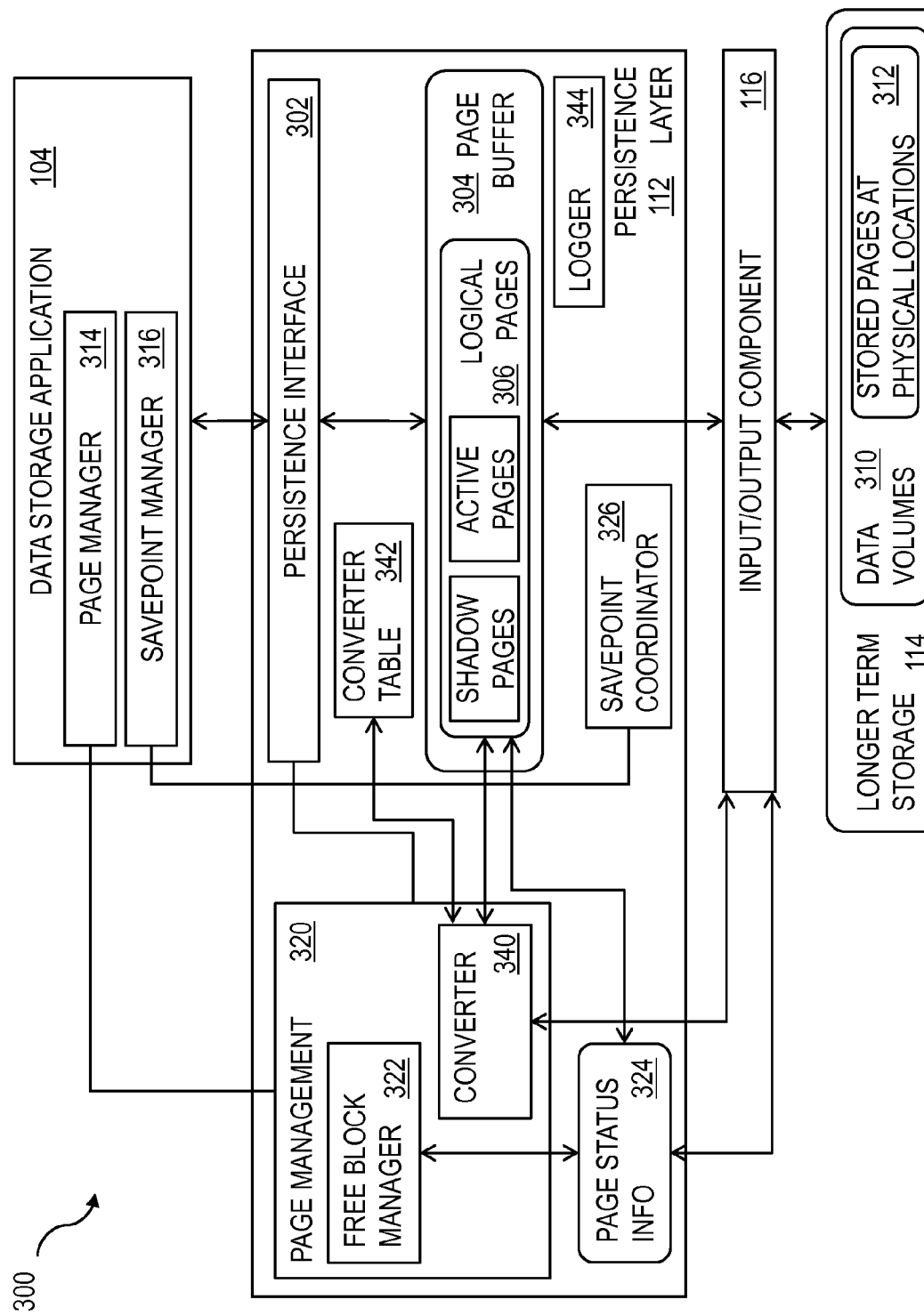
FIG. 3 is a diagram illustrating features of a system architecture at least some of whose features are consistent with implementations of the current subject matter.

FIG. 3 shows a software architecture 300 consistent with one or more features of the current subject matter. A data storage application 104, which can be implemented in one or more of hardware and software, can include one or more of a database application, a network-attached storage system, or the like. According to at least some implementations of the current subject matter, such a data storage application 104 can include or otherwise interface with a persistence layer 112 or other type of memory buffer, for example via a persistence interface 302. A page buffer 304 within the persistence layer 112 can store one or more logical pages 306, optionally can include shadow pages, active pages, and the like. The logical pages 306 retained in the persistence layer 112 can be written to a storage (e.g. a longer term storage) 114 via an input/output component 116, which can be a software module, a sub-system implemented in one or more of software and hardware, or the like. The storage 114 can include one or more data volumes 310 where stored pages 312 are allocated at physical memory blocks.

In some implementations, the data storage application 104 can include or be otherwise in communication with a page manager 314 and/or a savepoint manager 316. The page manager 314 can communicate with a page management module 320 at the persistence layer 112 that can include a free block manager 322 that monitors page status information 324, for example the status of physical pages within the storage 114 and logical pages in the persistence layer 112 (and optionally in the page buffer 304). The savepoint manager 316 can communicate with a savepoint coordinator 326 at the persistence layer 204 to handle savepoints, which are used to create a consistent persistent state of the database or other records stored by a data storage application for restart after a possible crash.

A converter 340, which can be part of or in communication with the page management module 330, can be included to track mappings between logical pages and physical pages written to the storage 114. The converter 340 can maintain a current mapping of logical pages 306 to the corresponding physical pages in a converter table. When a logical page 306 is read from storage 114, the storage page to be loaded can be looked up using the converter 340. When a logical page 306 is written to storage 114 the first time after a savepoint, a new free storage page can be assigned to the logical page 306. The free block manager 322 can mark the new storage page as "used" and the new mapping can be stored in the converter table.

In some implementations, for example as shown in FIG. 3, logical pages 306 are loaded into the page buffer 304 in memory to provide read and write access. The page buffer 304 need not have a particular minimum or maximum size, but can in some implementations use some or all free memory that is not allocated for other data or tasks. If the memory is needed elsewhere, least recently used logical pages 306 can be removed from the page buffer 304. For example, if a modified page is chosen to be removed, that logical page 306 can be saved from the persistence layer 112 to longer term storage, for example by being passed to the input/output component 116 for writing to the storage 114.

The persistence layer 112 can ensure that changes made in the data storage application 104 are durable and that the data storage application 104 can be restored to a most recent committed state after a restart. Writing data to the storage 114 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 344 can also be included to store the changes made to the data of the data storage application in a linear log. The logger component can be used during recovery to replay operations since last savepoint to ensure that all operations are applied to the data and that transactions with a logged "COMMIT" record are committed before rolling back still-open transactions at the end of a recovery process.

Figure 4:
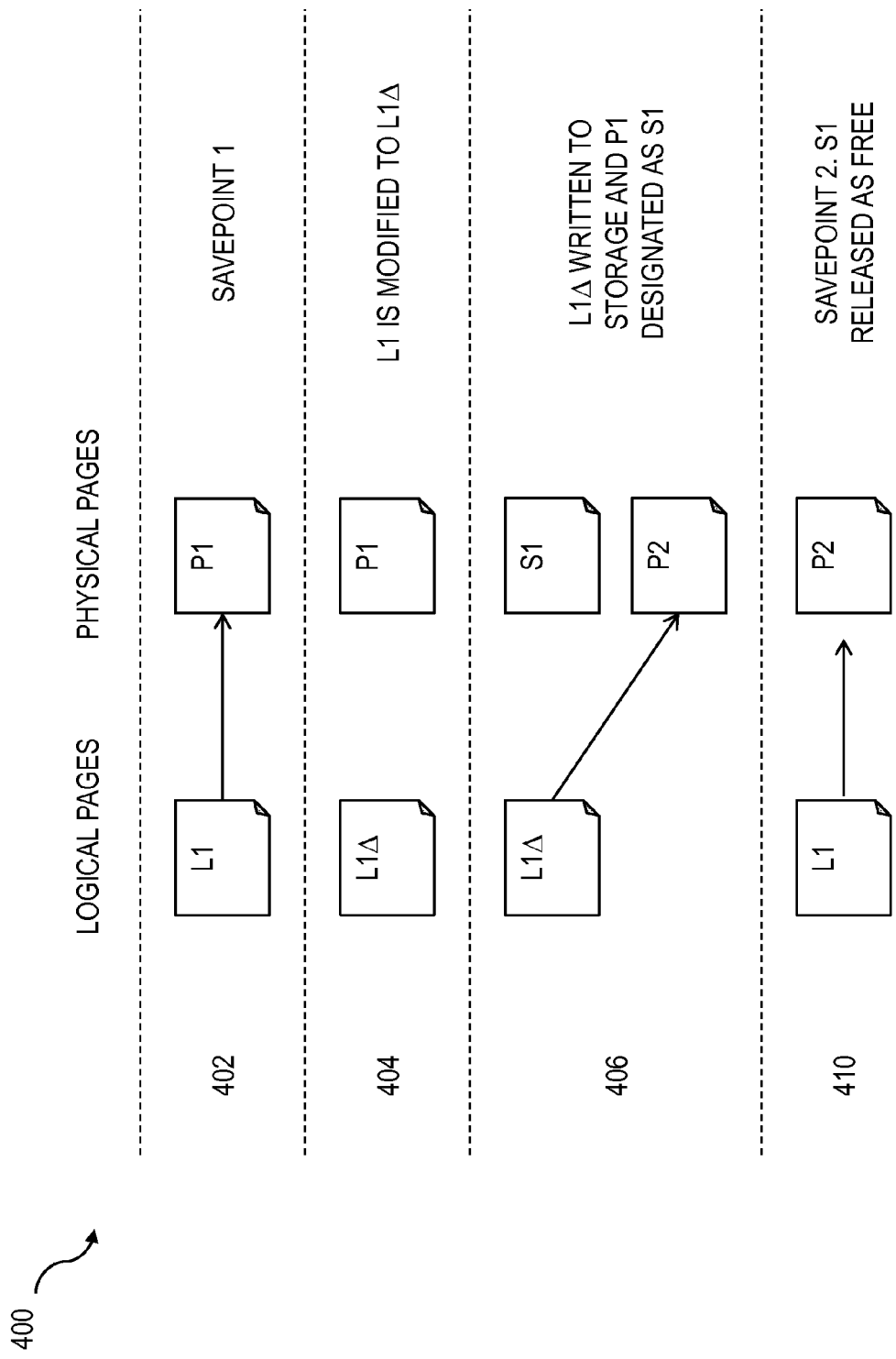
FIG. 4 is a logic flow diagram illustrating features consistent with one or more implementations of the current subject matter.

In an example of a shadow paging approach to retaining uncommitted changes, a shadow page that contains a savepoint version of a logical page is not overwritten until the next savepoint is successfully completed. This can be reflected in a page status table maintained by the system (e.g. in a free block manager as described below). As shown in the logical flow diagram 400 of FIG. 4, a logical page L1 is written to a first physical page P1 during a most recent savepoint at 402 and a mapping (L1, P1) is added to a converter table 342. After the savepoint, at 404 the logical page L1 is modified again to become L1Δ. When L1 needs to be written to the storage 114 again, for example because of cache replacement or because the next savepoint operation has begun, the first physical page P1 becomes a shadow page S1 and a new free first physical page P2 is assigned to the logical page L1. The first physical page P2 is marked as "used" and a new mapping (L1, P2) is written to the converter table 342 at 406. The old mapping is still available in an old version of the converter table that was stored with the most recent savepoint. The first physical page P1 is still needed to retain the shadow page S1, so its status is not set to "free." Instead, the first physical page P1 can be designated with a status of "free after savepoint." When the next savepoint is completed at 410, the status of the first physical page P1 can then be updated to "free."

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A computer program product comprising a non-transitory machine-readable medium storing instructions that, when executed by at least one programmable processor, cause the at least one programmable processor to perform operations comprising:
    determining a data size of contents of a unit of data related to another unit of data, wherein the unit of data and the other unit of data are to be written to a storage by an input/output module of a data storage application;
    selecting, from a plurality of storage page sizes, a storage page size to accommodate the data size, wherein the data size is smaller than or equal to the storage page size, and wherein the plurality of storage page sizes comprises page sizes varying from a minimum atomic input/output size of the input/output module to a maximum page size;
    assigning the unit of data to a storage page having the selected storage page size; and
    passing the storage page to the input/output module so that the input/output module physically clusters the unit of data with the other unit of data when the input/output module writes the unit of data and the other unit of data to the storage, wherein the plurality of storage page sizes includes page sizes varying over at least one regular interval.

2. A computer program product as in claim 1, wherein the data storage application comprises at least one of a database application and a network-attached storage system.

3. A computer program product as in claim 1, wherein the at least one regular interval comprises a factor of four.

4. A computer program product as in claim 1, wherein the at least one regular interval comprises an integer factor greater than 1 and smaller than approximately 10.

5. A computer program product as in claim 1, wherein the data size of the unit of data is associated with a persistence layer.

6. A system comprising:
    at least one programmable processor; and
    a non-transitory machine-readable medium storing instructions that, when executed by the at least one programmable processor, cause the at least one programmable processor to perform operations comprising:
    determining a data size of contents of a unit of data related to another unit of data, wherein the unit of data and the other unit of data are to be written to a storage by an input/output module of a data storage application;
    selecting, from a plurality of storage page sizes, a storage page size to accommodate the data size, wherein the data size is smaller than or equal to the storage page size, and wherein the plurality of storage page sizes comprises page sizes varying from a minimum atomic input/output size of the input/output module to a maximum page size;
    assigning the unit of data to a storage page having the selected storage page size; and
    passing the storage page to the input/output module so that the input/output module physically clusters the unit of data with the other unit of data when the input/output module writes the unit of data and the other unit of data to the storage, wherein the plurality of storage page sizes includes gage sizes varying over at least one regular interval.

7. A system as in claim 6, wherein the data storage application comprises at least one of a database application and a network-attached storage system.

8. A system as in claim 6, wherein the at least one regular interval comprises a factor of four.

9. A system as in claim 6, wherein the at least one regular interval comprises an integer factor greater than 1 and smaller than approximately 10.

10. A system as in claim 6, wherein the data size of the unit of data is associated with a persistence layer.

11. A computer-implemented method comprising:
    determining a data size of contents of a unit of data related to another unit of data, wherein the unit of data and the other unit of data are to be written to a storage by an input/output module of a data storage application;
    selecting, from a plurality of storage page sizes, a storage page size to accommodate the data size, wherein the data size is smaller than or equal to the storage page size, and wherein the plurality of storage page sizes comprises page sizes varying from a minimum atomic input/output size of the input/output module to a maximum page size;
    assigning the unit of data to a storage page having the selected storage page size; and
    passing the storage page to the input/output module so that the input/output module physically clusters the unit of data with the other unit of data when the input/output module writes the unit of data and the other unit of data to the storage, wherein the plurality of storage page sizes includes page sizes varying over at least one regular interval.

12. A computer-implemented method as in claim 11, wherein the data storage application comprises at least one of a database application and a network-attached storage system.

13. A computer-implemented method as in claim 11, wherein the at least one regular interval comprises a factor of four.

14. A computer-implemented method as in claim 11, wherein the at least one regular interval comprises an integer factor greater than 1 and smaller than approximately 10.

15. A computer-implemented method as in claim 11, wherein the data size of the unit of data is associated with a persistence layer.

16. A computer-implemented method as in claim 11, wherein at least one of the determining, the selecting, the assigning, and the passing is performed by at least one programmable processor.

\* \* \* \* \*

UNITED STATES PATENT AND TRADEMARK OFFICE
CERTIFICATE OF CORRECTION

| | | |
|---|---|---|
| PATENT NO. | : 9,116,627 B2 | Page 1 of 1 |
| APPLICATION NO. | : 14/302226 | |
| DATED | : August 25, 2015 | |
| INVENTOR(S) | : Dirk Thomsen et al. | |

It is certified that error appears in the above-identified patent and that said Letters Patent is hereby corrected as shown below:

In the Claims - At column 8, claim number 6, line number 25, should read

"includes page sizes varying over at least one regular"

Signed and Sealed this
Nineteenth Day of January, 2016

Michelle K. Lee
*Director of the United States Patent and Trademark Office*